United States Patent
Fehlings et al.

(10) Patent No.: US 8,666,604 B2
(45) Date of Patent: Mar. 4, 2014

(54) METHOD OF DETECTING EXTERNAL IMPACTS IN VEHICLE STEERING SYSTEMS

(75) Inventors: Dieter Fehlings, Kempen (DE); Marcus Weser, Neuss (DE)

(73) Assignee: TRW Automotive GmbH, Alfdorft (DE)

( * ) Notice: Subject to any disclaimer, the term of this patent is extended or adjusted under 35 U.S.C. 154(b) by 163 days.

(21) Appl. No.: 13/195,564

(22) Filed: Aug. 1, 2011

(65) Prior Publication Data
US 2012/0029774 A1    Feb. 2, 2012

(30) Foreign Application Priority Data
Aug. 2, 2010  (DE) .......................... 10 2010 033 066

(51) Int. Cl.
*A01B 69/00*    (2006.01)

(52) U.S. Cl.
USPC .................................. 701/42; 701/41; 701/69

(58) Field of Classification Search
USPC ........... 701/41, 42, 69, 72; 180/446; 318/432, 318/489
See application file for complete search history.

(56) References Cited

U.S. PATENT DOCUMENTS

| | | | |
|---|---|---|---|
| 4,956,590 A | * | 9/1990 | Phillips .......................... 318/432 |
| 2008/0312794 A1 | | 12/2008 | Roth |
| 2009/0294206 A1 | | 12/2009 | Oblizajek et al. |

FOREIGN PATENT DOCUMENTS

| | | |
|---|---|---|
| DE | 10344279 A1 | 4/2004 |
| DE | 10360582 A1 | 7/2004 |
| DE | 102007027948 A1 | 12/2008 |
| DE | 102009020826 A1 | 1/2010 |
| DE | 102008061696 A1 | 6/2010 |

* cited by examiner

*Primary Examiner* — Gertrude Arthur Jeanglaude
(74) *Attorney, Agent, or Firm* — MacMillan, Sobanski & Todd, LLC (57) ABSTRACT

The invention relates to a method of detecting external impacts in vehicle steering systems (12) which include a rotatable steering shaft (16) and a servomotor (22) for generating a steering assist torque, the method including the steps of: (a) continuously measuring a first characteristic; (b) continuously measuring a second characteristic; (c) forming tuples of characteristics at least from a measured value of the first characteristic and a simultaneously picked up measured value of the second characteristic; (d) comparing the tuples of characteristics of step (c) with a predetermined normal operating range (36) of a multidimensional characteristic diagram (34) which is defined at least by the first characteristic and the second characteristic; and (e) storing a tuple of characteristics of step (c) and/or triggering an alarm signal if this tuple of characteristics from step (c) is outside the normal operating range (36).

16 Claims, 4 Drawing Sheets

METHOD OF DETECTING EXTERNAL IMPACTS IN VEHICLE STEERING SYSTEMS

CROSS-REFERENCE TO RELATED APPLICATIONS

This application claims the benefit of German Patent Application No. 10 2010 033 066.3, filed Aug. 2, 2010, the disclosure of which is incorporated herein by reference.

BACKGROUND OF THE INVENTION

The present invention relates to a method of detecting external impacts in vehicle steering systems which include a rotatable steering shaft and a servomotor for generating a steering assist torque.

External impacts in this connection are intended to mean sudden external influences on the steered wheels of a vehicle as may appear, for example, when driving against a curb at an angle or in the event of unevenness of the road. Such influences may turn out to be so heavy that a steering gear of the vehicle steering system is subjected to extreme mechanical stress. Depending on the magnitude and frequency of such extreme loads, impairments regarding service life and function can not be excluded.

The stress on the steering gear as caused by external impacts is especially pronounced in particular in electromechanical vehicle steering systems since, in comparison with hydraulic or electrohydraulic systems, they exhibit a higher mass inertia and higher system rigidity as well as lower damping.

In order to maintain the safety-relevant steering function of a vehicle over a desired service life, it is common nowadays to overdimension the mechanical components of the vehicle steering system to a certain degree, which, however, adversely affects the overall weight, the space requirement and the costs of the steering system.

DE 103 60 582 A1 in this connection discloses an electromechanical motor vehicle steering system including means for detecting the steering torques applied by the driver, means for detecting the assist torques of an electric servomotor of the steering system and/or means for detecting the steering currents of the electric servomotor. The steering system may also provide means for detecting the system temperature and means for detecting the operating time. In dependence on the values acquired, a control and evaluation device establishes at least one characteristic quantity as at least one degree of damage and generates an output signal or an information output when at least one predefined degree of damage is exceeded. This is to allow a better insight into the condition of stress on or damage to the steering system under the aspect of maintaining high safety and keeping maintenance expenditure low.

In this connection it is a problem that in the occurrence of external impacts, the measured values of the individual characteristic quantities of the vehicle steering system are on the same order of magnitude as the measured values for "normal", i.e. driver-initiated steering maneuvers. The individual measured values that are due to external impacts are typically even distinctly below the measured maximum values as occur in typical steering movements in vehicle operation. As a result, an identification of external impact events turns out to be fairly difficult.

BRIEF SUMMARY OF THE INVENTION

It is the object of the invention to reliably detect external impacts in vehicle steering systems involving little effort, that is, preferably only with the aid of characteristics that are already detected by the vehicle steering system anyway.

According to the invention, this object is achieved by a method of detecting external impacts in vehicle steering systems which include a rotatable steering shaft and a servomotor for generating a steering assist torque, the method including the steps of:

a) continuously measuring a first characteristic;
b) continuously measuring a second characteristic;
c) forming tuples of characteristics at least from a measured value of the first characteristic and a simultaneously picked up measured value of the second characteristic;
d) comparing the tuples of characteristics of step (c) with a predetermined normal operating range of a multidimensional characteristic diagram which is defined at least by the first characteristic and the second characteristic;
e) storing a tuple of characteristics of step (c) and/or triggering an alarm signal if this tuple of characteristics from step (c) is outside the normal operating range.

Fundamental to the invention is the formation of tuples of characteristics, taking into consideration at least first and second characteristics. The tuples of characteristics that correspond to a normal operation of the vehicle or the steering system without an action of significant external impacts define a multidimensional characteristic diagram with a predetermined normal operating range. This means that the tuples of characteristics that correspond to the usual steering maneuvers of the driver in vehicle operation and are preferably established empirically in the context of road tests are within the predetermined normal operating range. The mechanical stress on the steering system is usually non-critical here and, thus, a long service life accompanied by a reliable steering function is ensured. A wear as appears within the predetermined normal operating range is, as a rule, already taken into account when dimensioning the system components of the vehicle steering system, so that a reliable steering function is ensured over the desired service life. An impairment of the service life and/or the steering function is decisively determined by any suddenly occurring overload events such as external impacts. An essential aspect of the invention is based on the fact that by the occurrence of at least one tuple of characteristics that is outside the predetermined normal operating range, a conclusion may be drawn that an external impact is involved. If such a tuple of characteristics is outside the predetermined normal operating range, a suitable alarm signal can be triggered by means of which the driver is informed that a significant and possibly damaging action by an external impact on the chassis of the vehicle or the steered wheels thereof has taken place. As a result, a reliable differentiation is possible between a suddenly appearing external impact that may lead to a damage to the steering system and/or to the chassis, and a normal steering maneuver.

Accordingly, only few special events need to be detected over the service life of a motor vehicle, which has an advantageous effect on the computer power and memory capacity.

Preferably, the first characteristic is a motor signal. In particular the motor current, the motor voltage, the motor torque or the motor position (angle of rotation of the motor) or their derivatives (angular velocity of the motor, motor acceleration) are used as a motor signal of the servomotor here. At least one such motor signal, preferably several of these motor signals, are already detected in vehicle steering systems on a standard basis, so that no additional expenditure arises with respect to the sensor system.

In one variant of the method, the second characteristic is a further motor signal that is different from the first characteristic.

In an alternative variant of the method, however, the second characteristic is a driver steering signal. The term "driver steering signal" in this connection includes characteristics such as a driver steering torque or a driver steering angle or their derivatives (steering torque increase, steering angular velocity, steering angular acceleration). Since in vehicle steering systems commonly used today, one or more of the aforementioned driver steering signals are also detected, no additional expenditure arises at all with regard to the sensor system with the use of driver steering signals.

In this variant of the embodiment, a predetermined time correlation between a driver steering signal and an associated motor signal can be detected in relation to the normal operating range of the multidimensional characteristic diagram, the triggering of an alarm signal and/or the storing of a tuple of characteristics of step (c) being effected only when the tuple of characteristics is outside the normal operating range and, additionally, the time correlation between the driver steering signal or motor signal of the tuple of characteristics and the associated motor signal or driver steering signal varies, in particular reverses, in comparison with the predetermined time correlation. In this way, a plausibility check of the result of the tuples of characteristics which are outside the operating range is carried out. For example, here the driver steering signal of a tuple of characteristics that is outside the normal operating range is checked for whether the time correlation between a measured value of this driver steering signal and an associated measured value of the motor signal deviates from a predetermined time correlation. In this connection, an associated measured value of the motor signal is intended to mean a signal which is triggered with a predetermined time correlation in the case of a driver steering signal caused by a driver-initiated steering maneuver, in order to generate a desired steering assist torque. The variation in time correlation between the driver steering signal and the associated motor signal may be given by an increase or decrease in phase shift between these signals or even by a reversal of the chronological order of these signals. If the time correlation of the associated measured values is varied, more particularly reversed (the motor signal precedes its associated driver steering signal in terms of time), as compared with the predetermined time correlation, this speaks against a "normal" driver-initiated steering maneuver in the non-critical stress range and in favor of an external impact on the steerable wheels.

In a further variant of the method, an internal voltage of the servomotor and an on-board electrical system voltage are measured continuously, a triggering of a signal and/or a storing of the tuple of characteristics occurring in step (e) only when the tuple of characteristics is outside the normal operating range and the internal voltage of the servomotor is above the on-board electrical system voltage substantially at the same time. Thereby, too, a check is carried out as to whether a tuple of characteristics that is outside the normal operating range is actually attributable to an external impact. When the internal voltage of the servomotor is above the on-board electrical system voltage of the vehicle, this is suggestive of a generator mode of the servomotor and thus of an external impact. In fact, as a consequence of the energy of the external impact, the servomotor is driven in the nature of a generator, as a result of which a generator voltage is produced which causes the internal voltage of the servomotor to rise above the on-board electrical system voltage.

In another variant of the method, in step (a) or step (b) at least one further characteristic is continuously measured simultaneously with the first and second characteristics, the formation of the tuples of characteristics according to step (c) being effected taking the at least one further characteristic into consideration, and the multidimensional characteristic diagram being defined by the first characteristic, the second characteristic, and the at least one further characteristic. In this way, it is possible to use in particular three characteristics for the continuous formation of triples of characteristics which are compared with the normal operating range of a three-dimensional characteristic diagram spanned by the three characteristics. The detection of external impacts is plausibilized by this at least one further characteristic (e.g., further motor signal, further driver steering signal, further vehicle signal such as (transverse) acceleration, yaw rate, etc.).

Furthermore, steps (a) and (b) may include continuously measuring a third characteristic and a fourth characteristic; step (c) may include forming tuples of characteristics from a measured value of the third characteristic and a simultaneously picked up measured value of the fourth characteristic; step (d) may include incorporating these tuples of characteristics into a further multidimensional characteristic diagram in which a predetermined operating range is defined; and step (e) may include performing a signal triggering and/or a storing of the two tuples of characteristics if each tuple of characteristics is outside its operating range, the third characteristic being a motor signal and the fourth characteristic being a further motor signal that is different from the third characteristic or a driver steering signal. By means of this measure as well, it can be verified on the basis of the tuple of characteristics that is made up of the first and second characteristics and is outside its operating range whether an external impact on the steerable wheels of the vehicle has actually occurred.

In this variant of the method, the third characteristic or the fourth characteristic may be identical with the first or the second characteristic. The result obtained from the first tuple of characteristics (pair of characteristics with measured values of the first and second characteristics) can thus be already reliably verified with little effort by one single additional characteristic. As an alternative to two two-dimensional characteristic diagrams it would in this case also be possible to span a three-dimensional characteristic diagram in which, rather than pairs of characteristics, triples of characteristics are then incorporated.

The characteristic diagram may be subdivided into a plurality of overload ranges outside the normal operating range, the individual overload ranges differing by their respectively associated signal triggering and/or storage of the tuple of characteristics. Just like the normal operating range, these overload ranges are determined empirically by applying impacts of different intensities to the steerable wheels. These different impact intensities result in different stresses on the vehicle steering system and thus, in an appropriate manner, in different triggerings of signals as well. For example, in case an overload stress is low, merely a storage of the tuple of characteristics may be performed without the driver being immediately advised of this overload event. In cases of greater overload stress, a warning light may additionally flash and/or an acoustic signal may sound which alerts the driver to the overload. In critical cases of overload, the driver may be advised that he/she should visit a garage as quickly as possible. Alternatively or additionally, the vehicle may be switched to a safety mode, in which only a predetermined, reduced steering assist torque is still generated, the reduction in the steering assist torque provided being adapted to be effected as a function of the intensity of the external impacts detected. In case of a risk that a damage to the steering gear, the steering system and/or the chassis has occurred as a consequence of an extraordinarily high overload stress, it is in this case even possible for the ignition to be interrupted when the vehicle is restarted, resulting in the vehicle being put out of operation for safety reasons.

The object initially mentioned is also achieved according to the invention by a method of detecting external impacts in vehicle steering systems which include a servomotor for generating a steering assist torque, an output of the servomotor in the generator mode being established and a signal being triggered and/or a measured value being stored when the output detected exceeds a predefined threshold value. In fact, as of a particular threshold value, the generator output of the servomotor is indicative of the vehicle steering system having been supplied with energy due to an external impact. External impacts on vehicle steering systems can already be detected with a high reliability, solely on the basis of this output examination. In addition, this output examination is, of course, also suitable for verifying the result based on a tuple of characteristics that is outside the operating range.

Preferably, an electrical energy supplied is calculated from the output established of the servomotor in the generator mode and an external impact force is determined therefrom. In this way, a signal tuned to the respective impact force can be triggered in a simple manner.

In order to establish the external impact force as close to reality as possible, preferably a predetermined system-dependent loss factor is taken into consideration in determining the external impact force. Using this loss factor, the fact is taken into account that not the entire impact force is converted into electrical energy, but losses such as friction, heat, or deformation occur.

Further features and advantages of the invention will be apparent from the following description of preferred embodiments with reference to the drawings.

DETAILED DESCRIPTION OF THE INVENTION

Figure 1:
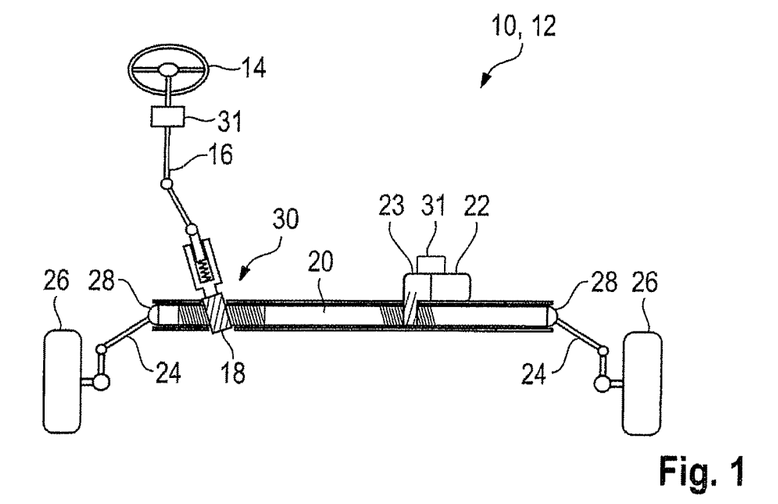
FIG. 1 shows a schematic diagram of a vehicle steering system.
Figure 2:
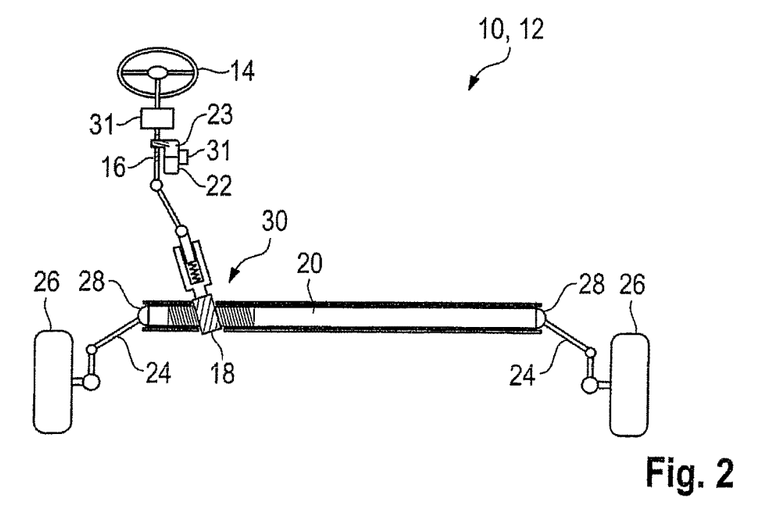
FIG. 2 shows a schematic diagram of an alternative vehicle steering system.

FIGS. 1 and 2 show a rack and pinion steering 10 for vehicles. In the exemplary embodiments illustrated, the rack and pinion steering 10 is part of an electromechanical vehicle steering system 12 in which a steering wheel 14 is connected with a pinion 18 by means of a steering shaft 16. The pinion 18 meshes with a rack 20, so that the latter is acted upon by a manual steering torque applied on the steering wheel 14. In addition, an electric servomotor 22 is provided, which is adapted to apply a steering assist torque to the rack 20 by means of a gearing 23 in a known manner.

The method as described below for detecting external impacts in vehicle steering systems is suited in particular for electromechanical vehicle steering systems 12, more specifically both in the variant as a rack and pinion drive, illustrated by way of example in FIG. 1, in which the servomotor 22 engages the rack 20, and also in the alternative variant as a steering shaft drive according to FIG. 2, in which the servomotor 22 engages the steering shaft 16.

According to FIGS. 1 and 2, the rack 20 is coupled at its axial ends to steerable wheels 26 of a vehicle by means of tie rods 24, the rack 20 being connected with the tie rods 24 by a respective ball and socket joint 28.

In the event of external impacts on the steerable wheels 26 of the vehicle, for example as caused by driving obliquely against the curb, extreme mechanical stresses on the vehicle steering system 12 may occur, in particular at the steering gear 30, i.e. in the region between the pinion 18 and the rack 20. Such extreme loads may adversely affect the service life and/or the function of the vehicle steering system 12. For this reason, these special events should be detected and, if required, be signaled to the driver immediately.

Figure 3:
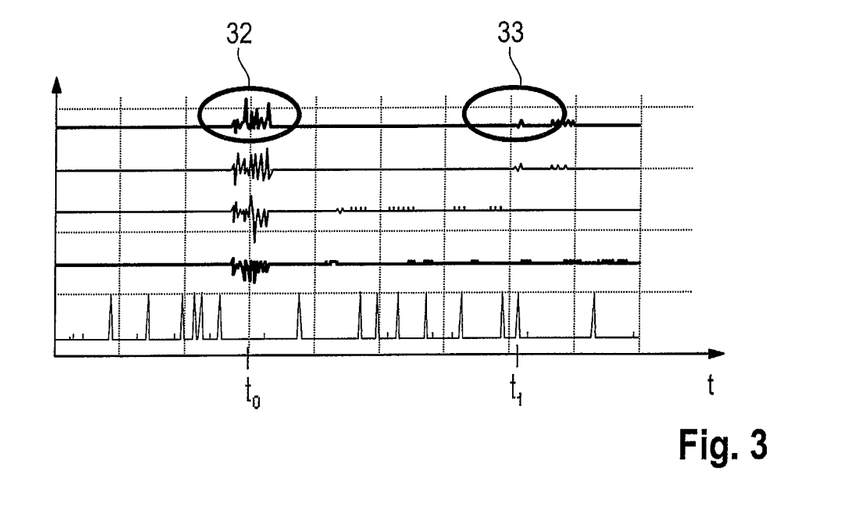
FIG. 3 shows a diagram in which various characteristics of the vehicle steering system are plotted versus time.

FIG. 3 shows a diagram in which various characteristics of the vehicle steering system 12 are plotted versus time t. These characteristics are either motor signals of the servomotor 22 such as, e.g., motor current, motor voltage, motor torque $M_{motor}$, or motor position (angle of rotation of the motor) or their derivatives (motor torque increase, angular velocity $\omega_{motor}$ of the motor, motor acceleration), or else driver steering signals such as, e.g., steering torque $M_{driver}$ or driver steering angle (steering shaft position) or the derivatives thereof (steering torque increase, steering angular velocity, steering angular acceleration), at least part of these characteristics being determined in today's vehicle steering systems 12 on a standard basis already. For measuring the above-mentioned characteristics, suitable sensor units 31 (see FIGS. 1 and 2) are provided on the servomotor 22 and/or on the steering shaft 16, i.e. between the steering wheel 14 and the pinion 18.

In the diagram according to FIG. 3, a steering maneuver was performed by the driver at $t \approx t_0$ (area 32), and an external impact on the steerable wheels 26 of the vehicle was applied at $t \approx t_1$ (area 33). It can be seen that the amplitudes of the five characteristics selected by way of example for the steering maneuver are at least as large as or distinctly larger than the amplitudes of the corresponding characteristics in the case of an external impact.

Consequently, the detection of external impacts by means of individual, conventional "standard characteristics" of vehicle steering systems 12 is difficult.

This problem is removed in the method described below in that a tuple of characteristics is formed taking into consideration at least a first and a second characteristic, the characteristics being measured continuously while the vehicle is in motion or in operation. This tuple of characteristics is then compared with a predetermined normal operation map of a multidimensional characteristic diagram to determine whether the tuple of characteristics in question is outside the predetermined normal operation map. In the affirmative, this is an indication that an external impact has taken place.

The method of detecting external impacts in vehicle steering systems 12 which include a rotatable steering shaft 16 and a servomotor 22 for generating a steering assist torque here includes the steps of:

(a) continuously measuring a first characteristic;
(b) continuously measuring a second characteristic;

(c) forming pairs 39 of characteristics from a measured value of the first characteristic and a simultaneously picked up measured value of the second characteristic;

(d) incorporating the pairs 39 of characteristics into a two-dimensional characteristic diagram 34 in which a predetermined normal operating range 36 is defined;

(d) incorporating the pairs 39 of characteristics into a two-dimensional characteristic diagram 34 in which a predetermined normal operating range 36 is defined; and (e) triggering a signal and/or storing the pair 39 of characteristics if the pair 39 of characteristics is outside the normal operating range 36.

In FIGS. 4 to 7, pairs 39 of characteristics (see FIG. 6) as a special form of the tuples of characteristics and, correspondingly, two-dimensional characteristic diagrams as a special form of multidimensional characteristic diagrams 34 will be discussed as an example for reasons of clearness. It should be appreciated that the method can be transferred without difficulty to tuples of characteristics made up of more than two characteristics and, correspondingly, characteristic diagrams with more than two dimensions.

"Continuously measuring" in this connection is to be understood as a measurement in sufficiently small, preferably regular time intervals, the time intervals being on the order of magnitude of a few milliseconds. To illustrate this more clearly, individual measured pairs 39 of characteristics are shown as dots in FIG. 6 as an example, with dots that are consecutive in time being connected by lines.

Figure 4:
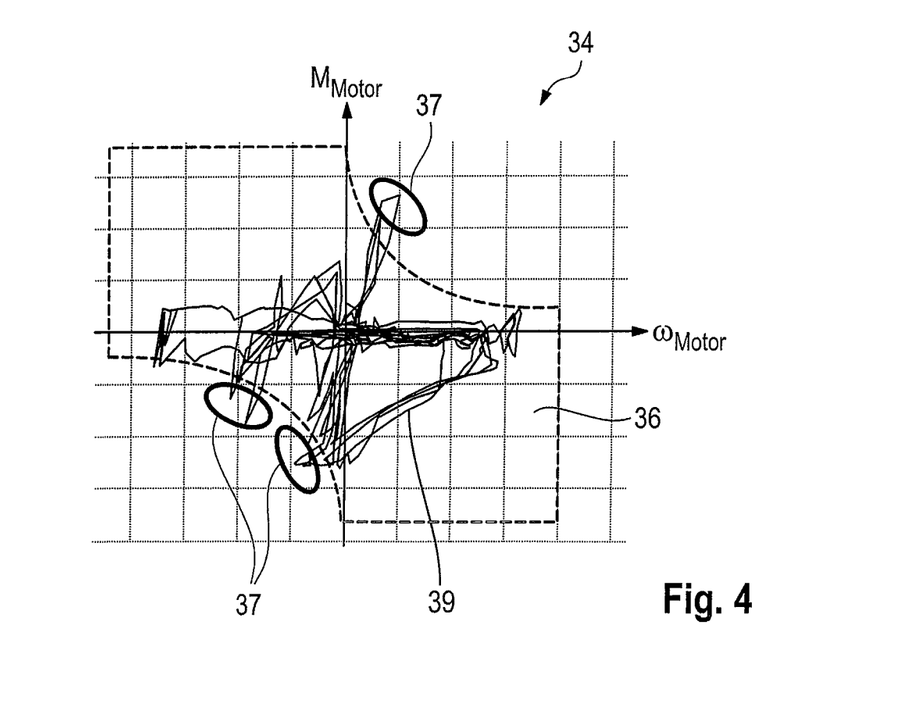
FIG. 4 shows a characteristic diagram in which the motor torque is plotted versus the motor angular velocity.

FIG. 4 shows a variant of the method in which the first characteristic is a motor signal, namely the angular velocity $\omega_{motor}$ of the motor, and the second characteristic is a further motor signal that is different from the first characteristic, namely the motor torque $M_{motor}$. The first and second characteristics, i.e. the angular velocity $\omega_{motor}$ of the motor and the motor torque $M_{motor}$, define a two-dimensional characteristic diagram 34, which is illustrated in FIG. 4. The characteristic diagram 34 contains pairs 39 of characteristics for "normal", i.e. driver-initiated, steering maneuvers, these pairs 39 of characteristics having been empirically established by road tests. An envelope of these pairs 39 of characteristics defines a predetermined normal operating range 36. It is possible that this predetermined normal operating range 36 is different for each steering system series or in dependence on the vehicle type.

In the present exemplary embodiment, the normal operating range 36 substantially comprises the second and fourth quadrants of the characteristic diagram 34, in which a motor mode of the servomotor 22 is reproduced, and a hyperbola-like region, facing the origin of coordinates, of the first and third quadrants, in which a generator mode of the servomotor 22 is reproduced. The assignment of the quadrants to the motor mode and the generator mode, respectively, of the servomotor 22 is, of course, dependent on the selected sign definitions of the respectively involved characteristics here.

FIG. 4 clearly shows that pairs 39 of characteristics which result from an external impact are outside the normal operating range 36 (see circled impact events 37). Accordingly, external impacts can be detected in vehicle steering systems 12 in that a storage of a pair 39 of characteristics and/or a triggering of a signal occur only when the respective pair 39 of characteristics is outside the predefined normal operating range 36.

The respective pair 39 of characteristics is preferably stored using a time stamp, so that a point in time of the impact event can be determined when the memory is read out in a garage, for example. Additionally, an optical and/or an acoustic signal may be triggered, which alerts the driver to an extreme load of the vehicle steering system 12 caused by an external impact.

Figure 5:
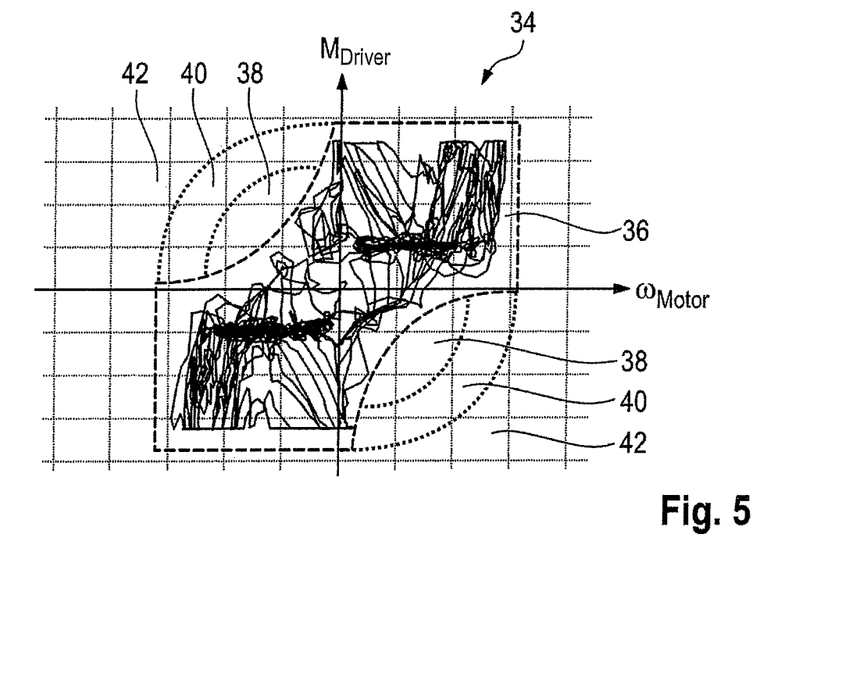
FIG. 5 shows a characteristic diagram in which the driver steering torque is plotted versus the motor angular velocity.

FIG. 5 shows a variant of the method in which the first characteristic is a motor signal, more particularly the angular velocity $\omega_{motor}$ of the motor, and the second characteristic is a driver steering signal, more particularly the driver steering torque $M_{driver}$. In FIG. 5, pairs 39 of characteristics from numerous driver-initiated steering maneuvers are incorporated in the two-dimensional characteristic diagram 34; again, an envelope of the pairs 39 of characteristics of usual steering maneuvers defines the normal operating range 36.

By analogy with FIG. 4, the normal operating range 36 is predetermined empirically for each steering system series in a vehicle-dependent manner and stored in an electronic controller of the vehicle steering system 12.

Figure 6:
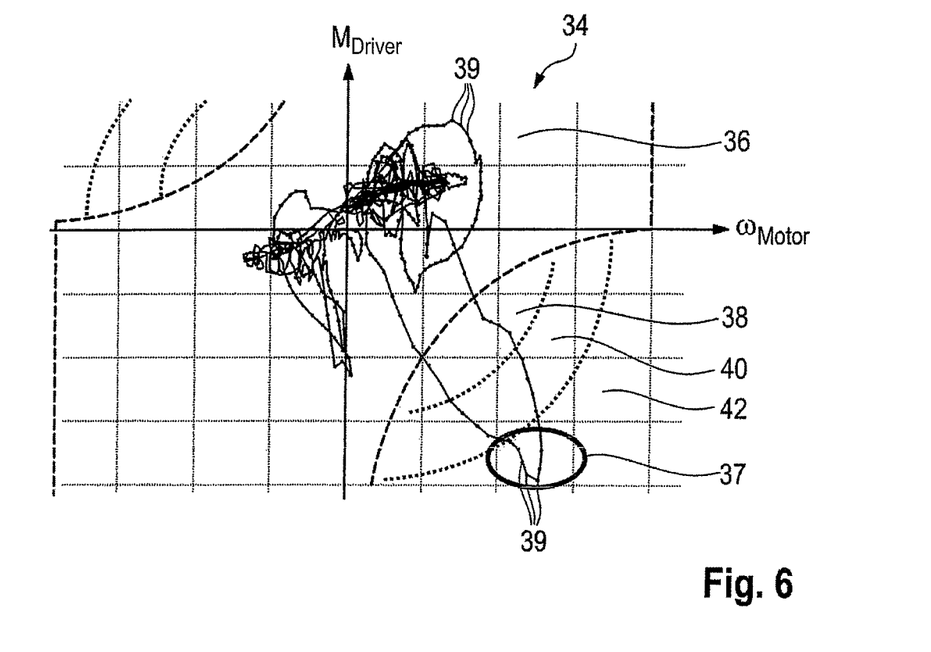
FIG. 6 shows a further characteristic diagram in which, by analogy with FIG. 5, likewise the driver steering torque is plotted versus the motor angular velocity.

According to FIGS. 5 and 6, outside the normal operating range 36, the characteristic diagram 34 is subdivided into a plurality of overload ranges 38, 40, 42, the individual overload ranges 38, 40, 42 differing by their respectively associated signal triggering and/or storage of the pair 39 of characteristics. Just like the normal operating range 36, the overload ranges 38, 40, 42 are empirically predetermined and stored in the electronic controller.

Preferably, the respective pair 39 of characteristics is stored in all overload ranges 38, 40, 42 outside the normal operating range 36. The overload range 38 is assigned to comparatively minor external impacts for which a storage of the pair 39 of characteristics is sufficient and no further signal triggering occurs.

In the event of medium to heavier external impacts, the respective pair 39 of characteristics is in the overload range 40. In this case, aside from the storage of the pair 39 of characteristics, an additional optical and/or acoustic signal is triggered which advises the driver of the overload event on the vehicle steering system 12 and, if required, suggests that he/she should visit a garage.

The overload range 42 is associated with especially heavy external impacts, where the triggering of the warning signal may cause the steering assist torque generated by the servomotor 22 to be reduced. Additionally and/or alternatively, provision may be made that the ignition of the vehicle is interrupted or deactivated in a subsequently intended use of the vehicle and the vehicle can therefore not be put into operation. This overload range 42 covers impacts in which a damage to or an impaired function of the vehicle steering system 12 is to be feared.

An accumulation function for adding up impacts in each overload range 38, 40, 42 is, of course, also conceivable. When a predefined number of impacts in the respective overload range 38, 40, 42 is reached, a signal may then also be triggered. For example, in the case of a plurality of minor impacts a signal may be triggered which is associated with a medium to major impact, and in the case of a plurality of medium to major impacts a signal may be triggered that is associated with a particularly heavy impact.

To verify the conclusion drawn based on a pair 39 of characteristics that is outside the normal operating range 36 that an external impact on the steerable wheels 26 or on the chassis has occurred, a number of different ways exist that can be implemented with little effort. One way of such verification consists in the consideration of at least one further characteristic in the form of a further vehicle signal, e.g., the acceleration about a vehicle axle, to be determined in a suitable manner, and/or the yaw rate of the vehicle, or the combination of these two signals. A further vehicle signal can be detected by further sensors such as, e.g., by distance sensors (optical or by radar), pull-out torque sensors, or the like. This provides for a redundant detection of an impact acting from outside, so that the assessment of the impact is possible with greater plausibility. This then allows reliable insight to be gained about the stress on the vehicle steering system 12, followed by specific measures that can be taken.

In normal steering maneuvers initiated by the driver, a time correlation between the driver steering signal and the motor signal remains substantially the same or unchanged, or the phase shift between these two signals is within a predetermined range. The chronological order of priority of the two signals and the phase shift thereof in relation to each other is referred to as a predetermined time correlation. In normal operation of the steering, the driver steering signal may lead the motor signal in terms of time in a predetermined range of the phase shift, for example. As a result, there exists a predetermined time correlation between the driver steering signal and the motor signal in normal operation of the steering system. This means that the tuples of characteristics for normal steering operation can always be associated with the normal operation map of the multidimensional characteristic diagram.

In one way of verifying external impact events, proceeding from a measured value of the driver steering signal (of a pair 39 of characteristics outside the normal operating range 36), the motor signal is checked for an associated measured value, a triggering of a signal and/or a storing of the pair 39 of characteristics taking place in step (e) only when the pair 39 of characteristics, for one thing, is outside the normal operating range 36 and, for another thing, a varied, in particular reversed, time correlation is present between the driver steering signal of the pair 39 of characteristics and the associated motor signal in comparison with the predetermined time correlation.

Should the time correlation between the driver steering signal and the associated motor signal be unchanged as compared with the predetermined time correlation, i.e. a time correlation as is to be expected in a normal, driver-initiated steering maneuver, this is suggestive of an ordinary steering maneuver by the driver, in which no extreme mechanical stresses on the vehicle steering system 12 occur. Therefore, such an event remains disregarded.

In a further way of verifying a supposed external impact, an internal voltage $U_{motor}$ of the servomotor 22 and an on-board electrical system voltage $U_{on\text{-}board\ electrical\ system}$ are measured continuously (see FIG. 7), a triggering of a signal and/or a storing of the pair 39 of characteristics taking place in step (e) only when the pair 39 of characteristics is outside the operating range 36 and the internal voltage $U_{motor}$ is above the on-board electrical system voltage $U_{on\text{-}board\ electrical\ system}$ substantially at the same time.

Figure 7:
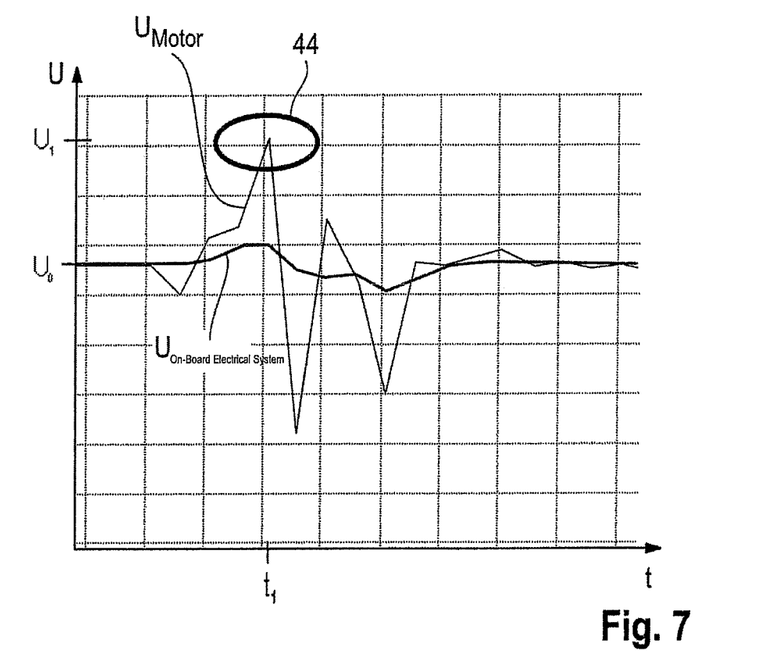
FIG. 7 shows a diagram in which the internal voltage of the servomotor and the on-board electrical system voltage are plotted versus the time t.

According to FIG. 7, the on-board electrical system voltage $U_{on\text{-}board\ electrical\ system}$ is almost constant at about $U_0$, and only fluctuates slightly about this value in the area 44 of an impact event that has occurred at $t_1$. The internal voltage $U_{motor}$ of the servomotor 22, on the other hand, rises to a maximum value of $U_1$ in the area 44. This distinct increase beyond $U_0$ is suggestive of a generator mode of the servomotor 22 as a consequence of an external impact event. The fluctuations of the internal voltage $U_{motor}$ and of the on-board electrical system voltage $U_{on\text{-}board\ electrical\ system}$ highly depend on an "electronic architecture" of the on-board electrical system of the vehicle here. Therefore, for this method of verification to attain a high reliability, a specific threshold value is frequently defined depending on the electrical on-board system architecture, which the internal voltage $U_{motor}$ is required to reach in relation to the on-board electrical system voltage $U_{on\text{-}board\ electrical\ system}$ to provide an indication of an external impact. This threshold value may, for example, be defined such that the internal voltage $U_{motor}$ must be above the average on-board electrical system voltage $U_{on\text{-}board\ electrical\ system}$ by a predefined amount in order to be rated an indication of an external impact on the steerable wheels 26 of the vehicle.

The events identified as external impacts based on a pair 39 of characteristics made up of a first characteristic and a second characteristic that are outside the normal operating range 36 may also be verified by the following extension of the method of detecting external impacts in vehicle steering systems 12: in steps (a) and (b), a third characteristic and a fourth characteristic are additionally measured continuously; in step (c), pairs 39 of characteristics are formed from a measured value of the third characteristic and a simultaneously picked up measured value of the fourth characteristic; in step (d), these pairs 39 of characteristics are incorporated into a further, two-dimensional characteristic diagram 34 in which a predetermined normal operating range 36 is defined; and, finally, in step (e), a signal triggering and/or a storing of the two pairs 39 of characteristics is effected only if each pair 39 of characteristics is outside its associated normal operating range 36, the third characteristic being a motor signal and the fourth characteristic being a further motor signal that is different from the third characteristic or a driver steering signal.

This means that two different pairs 39 of characteristics must be outside their respectively associated normal operating range 36, in order to assess an event that has occurred as an external impact.

In particular, for example, the evaluation of the pair 39 of characteristics made up of two motor signals according to FIG. 4 could be combined with an evaluation of the pair 39 of characteristics made up of a motor signal and a driver steering signal according to FIGS. 5 and 6.

In this connection, the third characteristic or the fourth characteristic may be identical with the first or the second characteristic. This would be the case in the above-mentioned example of a combination of the characteristic diagram information according to FIG. 4 with characteristic diagram information of FIGS. 5 and 6 since both underlying pairs 39 of characteristics each include the motor angular velocity $\omega_{motor}$ as the motor signal.

Alternatively, a three-dimensional characteristic diagram 34 including the motor torque $M_{motor}$, the motor angular velocity $\omega_{motor}$, and the driver steering torque $M_{driver}$ and having a three-dimensional normal operating range 36 could also be spanned, with corresponding triples of characteristics then being formed and checked for whether they are inside or outside a three-dimensional normal operating range 36.

In a further method of detecting external impacts in vehicle steering systems 12 which include a servomotor 22 for generating a steering assist torque, an output of the servomotor 22 is continuously established if the latter is in the generator mode. A signal is triggered and/or a measured value is stored when the output detected exceeds a predefined threshold value.

This method may be made use of for verifying the external impacts detected on the basis of pairs 39 of characteristics, but it also constitutes a reliable way of detecting external impacts in vehicle steering systems 12 even on its own.

Since a generator mode of the servomotor 22 is not necessarily to be attributed to an external impact, a threshold value needs to be predefined with respect to the generator output. This threshold value is selected here such that events such as a rapid manual countersteering, or steering return forces which appear based on the steering axle geometry and lead to a track-stabilizing return behavior of the steering to its center position, produce a generator output of the servomotor 22 below this threshold value. Any external impacts that are relevant within the scope of this invention, in contrast, result in a high amount of energy introduced in a very short time, that is, a very high generator output, which, accordingly, is above the predefined threshold value. These insights with respect to the generator mode in the final analysis also result in the hyperbola-like sections of the normal operating range 36 in the first and third quadrants according to FIG. 4.

The output as established of the servomotor 22 in the generator mode may be used for calculating with little effort an electrical energy supplied, from which an external impact force can be determined. The typical time period of the servomotor 22 in the generator mode as brought about by an external impact is on the order of about 20-30 ms.

Since, however, the external impact force does not by far transition into an electrical generator energy completely, a predetermined system-dependent loss factor is additionally included in determining the external impact force, the loss factor taking e.g. portions of energy into account which are converted into friction, heat or deformation.

A validation and/or assessment of an external impact detected is also possible by a consideration and/or combination of further signals such as, e.g., the yaw rate and/or the vehicle acceleration, in particular the transverse acceleration of the vehicle. These additional signals preferably are characteristics which are established by further elements of the vehicle sensor system anyway and are available in an electronic controller. Consequently, this type of validation does not lead to any additional expenditure in relation to the sensor system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of detecting external impacts in vehicle steering systems which include a rotatable steering shaft and a servomotor for generating a steering assist torque, the method comprising the steps of:
   (a) continuously measuring a first characteristic;
   (b) continuously measuring a second characteristic;
   (c) forming tuples of characteristics at least from a measured value of the first characteristic and a simultaneously picked up measured value of the second characteristic;
   (d) comparing the tuples of characteristics of step (c) with a predetermined normal operating range of a multidimensional characteristic diagram which is defined at least by the first characteristic and the second characteristic; and
   (e) storing a tuple of characteristics of step (c) and/or triggering an alarm signal if said tuple of characteristics from step (c) is outside the normal operating range.

2. The method according to claim 1 wherein the first characteristic is a motor signal.

3. The method according to claim 2 wherein the second characteristic is a further motor signal that is different from the first characteristic.

4. The method according to claim 2 wherein the second characteristic is a driver steering signal.

5. The method according to claim 4 wherein a predetermined time correlation between a driver steering signal and an associated motor signal is detected in relation to the normal operating range of the multidimensional characteristic diagram, the triggering of an alarm signal and/or the storing of a tuple of characteristics of step (c) being effected only when the tuple of characteristics is outside the normal operating range and the time correlation between the driver steering signal or motor signal of the tuple of characteristics and the associated motor signal or driver steering signal varies in comparison with the predetermined time correlation.

6. The method according to claim 1 wherein an internal voltage ($U_{motor}$) of the servomotor and an on-board electrical system voltage ($U_{on\text{-}board\ electrical\ system}$) are measured continuously, and a triggering of a signal and/or a storing of the tuple of characteristics occurs in step (e) only when the tuple of characteristics is outside the normal operating range and the internal voltage ($U_{motor}$) of the servomotor is above the on-board electrical system voltage ($U_{on\text{-}board\ electrical\ system}$) substantially at the same time.

7. The method according to claim 1 wherein in step (a) or step (b) at least one further characteristic is continuously measured simultaneously with the first and second characteristics, the formation of the tuples of characteristics according to step (c) being effected taking into consideration the at least one further characteristic, and the multidimensional characteristic diagram being defined by the first characteristic, the second characteristic, and the at least one further characteristic.

8. The method according to claim 1 wherein steps (a) and (b) include continuously measuring a third characteristic and a fourth characteristic; step (c) includes forming tuples of characteristics at least from a measured value of the third characteristic and a simultaneously picked up measured value of the fourth characteristic; step (d) includes comparing said tuples of characteristics with a predetermined normal operating range of a further multidimensional characteristic diagram which is defined at least by the third characteristic and the fourth characteristic; and step (e) includes storing the two simultaneously picked up tuples of characteristics of step (c) and/or triggering an alarm signal if each of the two tuples of characteristics is outside the normal operating range, with the third characteristic being a motor signal and the fourth characteristic being a further motor signal that is different from the third characteristic or a driver steering signal.

9. The method according to claim 8 wherein the third characteristic or the fourth characteristic is identical with the first or the second characteristic.

10. The method according to claim 1 wherein outside the normal operating range, the characteristic diagram is subdivided into a plurality of overload ranges, the individual overload ranges differing by their respectively associated signal triggering and/or storage of the tuple of characteristics.

11. The method according to claim 10 wherein the steering assist torque generated by the servomotor is reduced as a function of a predetermined overload range, so that the magnitude of an external impact detected has an influence on the steering assist torque generated.

12. A method of detecting external impacts in vehicle steering systems which include a servomotor for generating a steering assist torque comprising the steps of:
   establishing an output of the servomotor in a generator mode; and
   triggering a signal and/or storing a measured value when the output detected exceeds a predefined threshold value.

13. The method according to claim 12 wherein an electrical energy supplied is calculated from the output established of the servomotor in the generator mode and an external impact force is determined therefrom.

14. The method according to claim 13 wherein in determining the external impact force, a predetermined system-dependent loss factor is taken into consideration.

15. A method of detecting external impacts in vehicle steering systems which include a rotatable steering shaft and a servomotor for generating a steering assist torque, the method comprising the steps of:
   (a) continuously measuring a first characteristic;
   (b) continuously measuring a second characteristic;
   (c) forming tuples of characteristics at least from a measured value of the first characteristic and a simultaneously picked up measured value of the second characteristic;
   (d) comparing the tuples of characteristics of step (c) with a predetermined normal operating range of a multidimensional characteristic diagram which is defined at least by the first characteristic and the second characteristic; and
   (e) triggering an alarm signal if said tuple of characteristics from step (c) is outside the normal operating range.

16. The method according to claim 1 wherein an output of the servomotor in a generator mode is established and in step (c) a measured value is stored when the output detected exceeds a predefined threshold value.

* * * * *